United States Patent
Shono et al.

(10) Patent No.: US 12,247,177 B2
(45) Date of Patent: *Mar. 11, 2025

(54) REFRIGERATOR OIL AND REFRIGERATOR WORKING FLUID COMPOSITION

(71) Applicant: ENEOS Corporation, Tokyo (JP)

(72) Inventors: Yohei Shono, Tokyo (JP); Tatsuki Nakajima, Tokyo (JP); Shogo Hashimoto, Tokyo (JP); Yuya Mizutani, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 524 days.

This patent is subject to a terminal disclaimer.

(21) Appl. No.: 17/422,948

(22) PCT Filed: Feb. 19, 2020

(86) PCT No.: PCT/JP2020/006606
§ 371 (c)(1),
(2) Date: Jul. 14, 2021

(87) PCT Pub. No.: WO2020/171133
PCT Pub. Date: Aug. 27, 2020

(65) Prior Publication Data
US 2022/0064562 A1    Mar. 3, 2022

(30) Foreign Application Priority Data
Feb. 22, 2019  (JP) ................. 2019-030628

(51) Int. Cl.
| | | |
|---|---|---|
| *C10M 169/04* | (2006.01) | |
| *C09K 5/04* | (2006.01) | |
| *C10M 137/08* | (2006.01) | |
| *C10M 137/10* | (2006.01) | |
| *C10N 40/30* | (2006.01) | |

(52) U.S. Cl.
CPC ........... *C10M 169/04* (2013.01); *C09K 5/045* (2013.01); *C10M 137/08* (2013.01); *C10M 137/105* (2013.01); *C10M 2203/003* (2013.01); *C10M 2223/043* (2013.01); *C10M 2223/047* (2013.01); *C10N 2040/30* (2013.01)

(58) Field of Classification Search
CPC .......... C10N 2020/101; C10N 2030/06; C10N 2040/30; C09K 5/04; C09K 5/045; C10M 137/08; C10M 137/105; C10M 171/008; C10M 169/04; C10M 2223/045; C10M 223/043; C10M 2207/2835; C10M 2203/003; C10M 2223/047; C10M 2207/301

See application file for complete search history.

(56) References Cited

U.S. PATENT DOCUMENTS

| | | |
|---|---|---|
| 5,464,550 A | 11/1995 | Sasaki et al. |
| 6,756,346 B1 | 6/2004 | Baba et al. |
| 2002/0142922 A1 | 10/2002 | Yagishita et al. |
| 2005/0107269 A1 | 5/2005 | Yagishita et al. |
| 2012/0228541 A1 | 9/2012 | Takigawa et al. |
| 2013/0237463 A1 | 9/2013 | Yagishita |
| 2019/0161701 A1 | 5/2019 | Shono et al. |

FOREIGN PATENT DOCUMENTS

| | | |
|---|---|---|
| CN | 1319126 | 10/2001 |
| CN | 1930276 | 3/2007 |
| CN | 101506338 | 8/2009 |
| CN | 104837971 A | 8/2015 |
| CN | 105164238 | 12/2015 |
| CN | 105473693 | 4/2016 |
| CN | 105567397 | 5/2016 |
| CN | 109072115 | 12/2018 |
| JP | S59-075995 | 4/1984 |
| JP | H10-102079 | 4/1998 |
| JP | 2000-063866 | 2/2000 |
| JP | 2002-294271 | 10/2002 |
| JP | 2004-083891 | 3/2004 |
| JP | 2007-254607 | 10/2007 |
| JP | 2011-046880 | 3/2011 |
| JP | 2012-111803 | 6/2012 |
| JP | 2012-211338 | 11/2012 |
| KR | 10-2001-0099626 A | 11/2001 |
| KR | 10-2012-0081089 A | 7/2012 |
| KR | 10-2017-0081667 A | 7/2017 |
| WO | 2016/072296 | 5/2016 |
| WO | 2018/021533 | 2/2018 |
| WO | 2018/181203 | 10/2018 |

OTHER PUBLICATIONS

ISR issued in WIPO Patent Application No. PCT/JP2020/006606, Apr. 21, 2020, English translation.
IPRP issued in WIPO Patent Application No. PCT/JP2020/006606, Sep. 2, 2021, English translation.

*Primary Examiner* — Vishal V Vasisth
(74) *Attorney, Agent, or Firm* — GREENBLUM & BERNSTEIN, P.L.C.

(57) ABSTRACT

One aspect of the present invention is a refrigerating machine oil comprising a base oil, a dithiophosphoric acid ester, and an amine salt of an acidic phosphoric acid ester.

6 Claims, No Drawings

REFRIGERATOR OIL AND REFRIGERATOR WORKING FLUID COMPOSITION

This application is a 371 of PCT/JP2020/006606, filed Feb. 19, 2020.

TECHNICAL FIELD

The present invention relates to a refrigerating machine oil and a working fluid composition for a refrigerating machine.

BACKGROUND ART

A refrigerator such as a refrigerator, a car air conditioner, a room air conditioner, or a vending machine includes a compressor for circulating a refrigerant in a refrigeration cycle. The compressor is filled with refrigerating machine oil for lubricating the sliding members. The refrigerating machine oil is required to have properties such as abrasion resistance and stability.

Refrigerating machine oils generally contain base oils and additives selected according to the required properties as described above. For example, a phosphorus-based antiwear agent is added to a refrigerating machine oil required to have improved antiwear property (see Patent Literature 1).

CITATION LIST

Patent Literature

Patent Literature 1: WO 2016/072296

SUMMARY OF INVENTION

Technical Problem

The phosphorus-based antiwear agent as disclosed in Patent Literature 1 can improve the antiwear property of the refrigerating machine oil, but may impair the stability of the refrigerating machine oil due to its high activity.

Accordingly, an object of the present invention is to provide a refrigerating machine oil having excellent stability as well as excellent antiwear property.

Solution to Problem

As a result of investigation by the present inventors in order to solve the above-described problems, it has been found that, surprisingly, not only antiwear property but also stability can be improved by using two specific compounds in combination among compounds used as phosphorus-based antiwear agents.

That is, one aspect of the present invention is a refrigerating machine oil comprising: a base oil; a dithiophosphoric acid ester; and an amine salt of acidic phosphoric acid ester.

The dithiophosphoric acid ester may be compound represented by the following formula (A-1):

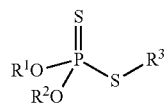

(A-1)

wherein $R^1$ and $R^2$ each independently represent hydrogen atom or a monovalent hydrocarbon group, $R^3$ represents a monovalent organic group, and at least one of $R^1$ and $R^2$ represents a monovalent hydrocarbon group.

The mass ratio of the content of the dithiophosphoric acid ester to the total content of the dithiophosphoric acid ester and the amine salt of acidic phosphoric acid ester may be 0.1 or more and 0.9 or less.

The refrigerating machine oil may have a sulfur content of 0.2% by mass or less.

The refrigerating machine oil may be used with a refrigerant comprising a hydrofluorocarbon refrigerant.

Another aspect of the present invention is a working fluid composition for a refrigerating machine, comprising: the above refrigerating machine oil; and a refrigerant.

The refrigerant may comprise a hydrofluorocarbon refrigerant.

Advantageous Effects of Invention

According to the present invention, it is possible to provide a refrigerating machine oil having excellent stability as well as excellent antiwear property.

DESCRIPTION OF EMBODIMENTS

One embodiment of the present invention is a refrigerating machine oil comprising a base oil (lubricating base oil), a dithiophosphoric acid ester, and an amine salt of acidic phosphoric acid ester.

Examples of the base oil include hydrocarbon oils, oxygen-containing oils, and the like. Examples of the hydrocarbon oils include mineral oil-based hydrocarbon oils and synthetic hydrocarbon oils. Examples of the oxygen-containing oils include esters, ethers, carbonates, ketones, silicones, and polysiloxanes.

The mineral oil-based hydrocarbon oils may be a paraffin-based mineral oil, a naphthene-based mineral oil, or the like, which can be obtained by refining a lubricant fraction obtainable from atmospheric distillation and vacuum distillation of paraffinic, naphthenic, or other crude oils according to a method(s) such as solvent deasphalting, solvent refining, hydrorefining, hydrogenolysis, solvent dewaxing, hydrodewaxing, clay treatment, and sulfuric-acid treatment. These refining methods may be used alone or in combination of two or more.

The synthetic hydrocarbon oils include alkylbenzenes, alkylnaphthalenes, poly-α-olefins (PAO), polybutenes, ethylene-α-olefin copolymers, and the like.

The alkylbenzene may be at least one selected from the group consisting of an alkylbenzene (X) and an alkylbenzene (Y) described below.

The alkylbenzene (X): an alkylbenzene having 1 to 4 alkyl groups having 1 to 19 carbon atoms, in which the total number of carbon atoms in the alkyl group(s) is 9 to 19 (preferably an alkylbenzene having 1 to 4 alkyl groups having 1 to 15 carbon atoms, in which the total number of carbon atoms in the alkyl group(s) is 9 to 15).

The alkylbenzene (Y): an alkylbenzene having 1 to 4 alkyl groups having 1 to 40 carbon atoms, in which the total number of carbon atoms in the alkyl group(s) is 20 to 40 (preferably an alkylbenzene having 1 to 4 alkyl groups having 1 to 30 carbon atoms, in which the total number of carbon atoms in the alkyl group(s) is 20 to 30)

Specific examples of the alkyl group(s) having 1 to 19 carbon atoms in the alkylbenzene (X) include a methyl group, an ethyl group, a propyl group (including all isomers; the same applies hereinafter), a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group. These alkyl groups may be linear or branched, and are preferably branched in view of stability, viscosity properties, and the like. Especially in view of availability, the alkyl groups are more preferably branched alkyl groups which can be derived from oligomers of olefins such as propylene, butene, and isobutylene.

The number of alkyl groups in the alkylbenzene (X) is 1 to 4, and preferably 1 or 2 (that is, monoalkylbenzene, dialkylbenzene, or mixtures thereof) in view of stability and availability.

The alkylbenzene (X) may include only one type of alkylbenzene having a unitary structure, or may include a mixture of alkylbenzenes having different structures as long as they include 1 to 4 alkyl groups having 1 to 19 carbon atoms, and the total number of carbon atoms in the alkyl group(s) is 9 to 19.

Specific examples of the alkyl group(s) having 1 to 40 carbon atoms in the alkylbenzene (Y) include a methyl group, an ethyl group, a propyl group (including all isomers; the same applies hereinafter), a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, a pentacosyl group, a hexacosyl group, a heptacosyl group, an octacosyl group, a nonacosyl group, a triacontyl group, a hentriacontyl group, a dotriacontyl group, a tritriacontyl group, a tetratriacontyl group, a pentatriacontyl group, a hexatriacontyl group, a heptatriacontyl group, an octatriacontyl group, a nonatriacontyl group, and a tetracontyl group. These alkyl groups may be linear or branched, and are preferably branched in view of stability, viscosity properties, and the like. Especially in view of availability, the alkyl groups are more preferably branched alkyl groups which can be derived from oligomers of olefins such as propylene, butene, and isobutylene. In view of a more flash point, the alkyl groups are more preferably linear or branched alkyl groups which can be derived from linear alkylating agents such as normal paraffin, normal-α-olefin, or halides thereof, and are even more preferably branched alkyl groups.

The number of alkyl groups in the alkylbenzene (Y) is 1 to 4, and is preferably 1 or 2 (that is, monoalkylbenzene, dialkylbenzene, or mixtures thereof) in view of stability and availability.

The alkylbenzene (Y) may include only one type of alkylbenzene having a unitary structure, or may include a mixture of alkylbenzenes having different structures as long as they include 1 to 4 alkyl groups having 1 to 40 carbon atoms, and the total number of carbon atoms in the alkyl group(s) is 20 to 40.

A poly-α-olefins (PAO) can be obtained as follows: for example, several molecules of a linear olefin having 6 of 18 carbon atoms and having a double bond only at one end are polymerized, and then hydrogenated. The poly-α-olefin may be an isoparaffin having a molecular weight distribution mainly including, for example, a trimer or tetramer of α-decene having 10 carbon atoms or α-dodecene having 12 carbon atoms.

Examples of the ester include aromatic esters, dibasic acid esters, polyol esters, complex esters, carbonate esters, and mixtures thereof. The ester is preferably a polyol ester or a complex ester.

The polyol ester is an ester of polyhydric alcohol and fatty acid. The fatty acid is preferably a saturated fatty acid. The number of carbon atoms of the fatty acid is preferably 4 to 20, more preferably 4 to 18, even more preferably 4 to 9, and particularly preferably 5 to 9. The polyol ester may be a partial ester in which some of the hydroxy groups of polyhydric alcohol remain unesterified, or may be a complete ester in which all the hydroxy groups are esterified, or may be a mixture of a partial ester and a complete ester. The polyol ester preferably has a hydroxy value of 10 mg KOH/g or less, more preferably 5 mg KOH/g or less, and even more preferably 3 mg KOH/g or less.

The ratio of the fatty acid having 4 to 20 carbon atoms is preferably 20 to 100% by mole, more preferably 50 to 100% by mole, even more preferably 70 to 100% by mole, and particularly preferably 90 to 100% by mole, based on the total fatty acid constituting the poly ester.

Specific examples of the fatty acid having 4 to 20 carbon atoms include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, and icosanoic acid. These types of the fatty acid may be linear or branched. The fatty acid is preferably branched at the α and/or β positions, and more preferably selected from 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid, and 2-ethylhexadecanoic acid, and even more preferably selected from 2-methylpropanoic acid and 3,5,5-trimethylhexanoic acid.

The fatty acid preferably includes branched fatty acid having 4 to 9 carbon atoms among these types of fatty acid. The ratio of branched fatty acid having 4 to 9 carbon atoms in the fatty acid is preferably 20 to 100% by mole, more preferably 50 to 100% by mole, even more preferably 70 to 100 mole %, and particularly preferably 90 to 100% by mole.

The fatty acid may include fatty acid having a number of carbon atoms other than 4 to 20. For example, the fatty acid having a number of carbon atoms other than 4 to 20 may have a number of carbon atoms of 21 to 24. Fatty acid having 21 to 24 carbon atoms may be henicosanoic acid, docosanoic acid, tricosanoic acid, tetracosanoic acid, or the like, and may be linear or branched.

The polyhydric alcohol constituting the polyol ester preferably has 2 to 6 hydroxy groups. The number of carbon atoms of the polyhydric alcohol is preferably 4 to 12, more preferably 5 to 10. The polyhydric alcohol is preferably a hindered alcohol such as neopentyl glycol, trimethylolethane, trimethylolpropane, trimethylolbutane, di-(trimethylolpropane), tri-(trimethylolpropane), pentaerythritol, and dipentaerythritol, and more preferably pentaerythritol, dipentaerythritol, or a mixed alcohol of pentaerythritol and dipentaerythritol, in view of particularly excellent compatibility with a refrigerant and hydrolytic stability.

The complex ester may be synthesized, for example, by the following method (C1) or (C2):
(C1) a method including: adjusting the molar ratio of polyhydric alcohol and polybasic acid, and synthesizing an ester intermediate in which some of the carboxyl groups of the polybasic acid remain unesterified, and then esterifying the remaining carboxyl groups with monohydric alcohol;

(C2) a method including: adjusting the molar ratio of polyhydric alcohol and polybasic acid, and synthesizing an ester intermediate in which some of the hydroxy groups of the polyhydric alcohol remain unesterified, and then esterifying the remaining hydroxy groups with monocarboxylic fatty acid.

The complex ester obtained by the method (C1) can suppress the formation of strong acid upon hydrolysis during use as a refrigerating machine oil, and thus tends to show superior stability as compared with the complex ester obtained by the method (C2). Therefore, the complex ester is preferably the complex ester with more stability which is obtained by the method (C1).

The complex ester is preferably an ester synthesized from at least one selected from a polyhydric alcohol having 2 to 4 hydroxy groups, at least one selected from a polybasic acid having 6 to 12 carbon atoms, and at least one selected from a monohydric alcohol having 4 to 18 carbon atoms and a monocarboxylic fatty acid having 2 to 12 carbon atoms.

Examples of the polyhydric alcohol having 2 to 4 hydroxy groups include neopentyl glycol, trimethylolpropane, pentaerythritol, and the like. The polyhydric alcohol having 2 to 4 hydroxy groups is preferably selected from neopentyl glycol and trimethylolpropane because suitable viscosity can be secured, and good low-temperature properties can be obtained when a complex ester is used as a base oil, and more preferably neopentyl glycol because viscosity can widely be adjusted.

Preferably, the polyhydric alcohol of the complex ester further include dihydric alcohol having 2 to 10 carbon atoms other than neopentyl glycol in addition to polyhydric alcohol having 2 to 4 hydroxy groups. Examples of the dihydric alcohol having 2 to 10 carbon atoms other than neopentyl glycol include ethylene glycol, propanediol, butanediol, pentanediol, hexandiol, 2-methyl-1,3-propanediol, 3-methyl-1,5-pentanediol, 2,2-diethyl-1,3-pentanediol, and the like. The above dihydric alcohol is preferably butanediol in view of excellent properties as a base oil. Examples of the butanediol include 1,2-butanediol, 1,3-butanediol, 1,4-butanediol, 2,3-butanediol, and the like. The butanediol is preferably selected from 1,3-butanediol and 1,4-butanediol in view of obtaining good properties. The amount of the dihydric alcohol having 2 to 10 carbon atoms other than neopentyl glycol is preferably 1.2 mole or less, more preferably 0.8 mole or less, and even more preferably 0.4 mole or less, based on 1 mole of the polyhydric alcohol having 2 to 4 hydroxy groups.

Examples of the polybasic acid having 6 to 12 carbon atoms include adipic acid, pimelic acid, suberic acid, azelaic acid, sebacic acid, phthalic acid, trimellitic acid, and the like. In view of excellently balanced properties of the synthesized esters and availability, the above polybasic acid is preferably selected from adipic acid and sebacic acid, and more preferably is adipic acid. The amount of the polybasic acid having 6 to 12 carbon atoms is preferably 0.4 mole to 4 mole, more preferably 0.5 mole to 3 mole, and even more preferably 0.6 mole to 2.5 mole, based on 1 mole of the polyhydric alcohol having 2 to 4 hydroxy groups.

Examples of the monohydric alcohol having 4 to 18 carbon atoms include aliphatic alcohols such as butanol, pentanol, hexanol, heptanol, octanol, nonanol, decanol, dodecanol, and oleyl alcohol. These monohydric alcohols may be linear or branched. Especially in view of balanced properties, the monohydric alcohol 4 to 18 carbon atoms is preferably monohydric alcohol 6 to 10 carbon atoms, and more preferably monohydric alcohol having 8 to 10 carbon atoms. The above monohydric alcohol is even more preferably selected from 2-ethylhexanol and 3,5,5-trimethylhexanol because the synthesized complex ester will have good low-temperature properties.

Examples of the monocarboxylic fatty acid having 2 to 12 carbon atoms include ethanoic acid, propanoic acid, butanoic acid, pentanoic acid, hexanoic acid, heptanoic acid, octanoic acid, nonanoic acid, decanoic acid, dodecanoic acid, and the like. Such monocarboxylic fatty acid may be linear or branched. The monocarboxylic fatty acid having 2 to 12 carbon atoms is preferably a monocarboxylic fatty acid having 8 to 10 carbon atoms, and is more preferably 2-ethylhexanoic acid and 3,5,5-trimethylhexanoic acid in view of low-temperature properties.

Examples of the ether include, polyvinyl ether, polyalkylene glycol, polyphenyl ether, perfluoroether, and mixtures thereof, and the like. The ether is preferably selected from a polyvinyl ether and a polyalkylene glycol, and is more preferably a polyvinyl ether.

The polyvinyl ether has a structural unit represented by the following formula (1):

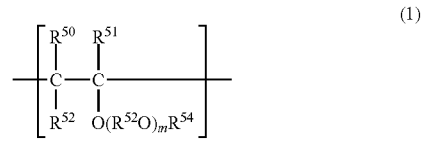

wherein $R^{50}$, $R^{51}$ and $R^{52}$ may be the same or different from each other, and each represent a hydrogen atom or a hydrocarbon group, and $R^{53}$ represents a divalent hydrocarbon group or a divalent ether-linked oxygen-containing hydrocarbon group, and $R^{54}$ represents a hydrocarbon group, and m represents an integer of 0 or more. When m is 2 or more, multiple $Rs^{53}$ may be the same or different from each other.

The number of carbon atoms of the hydrocarbon groups represented by $R^{50}$, $R^{51}$, and $R^{52}$ is preferably 1 or more, more preferably 2 or more, and more preferably 3 or more, and are preferably 8 or less, more preferably 7 or less, and even more preferably 6 or less. At least one of $R^{50}$, $R^{51}$, and $R^{52}$ is preferably a hydrogen atom, and more preferably, $R^{50}$, $R^{51}$, and $R^{52}$ are all hydrogen atoms.

The number of carbon atoms of the divalent hydrocarbon group and the ether-linked oxygen-containing hydrocarbon group represented by $R^{53}$ is preferably 1 or more, more preferably 2 or more, and even more preferably 3 or more, and are preferably 10 or less, more preferably 8 or less, and even more preferably 6 or less. The divalent ether-linked oxygen-containing hydrocarbon group represented by $R^{53}$, for example, may have oxygen on a side chain which can form an ether linkage.

$R^{54}$ is preferably a hydrocarbon group having 1 to 20 carbon atoms. Examples of this hydrocarbon group include an alkyl group, a cycloalkyl group, a phenyl group, an aryl group, an arylalkyl group, and the like. The above hydrocarbon group is preferably an alkyl group, more preferably an alkyl group having 1 to 5 carbon atoms.

m is preferably 0 or more, more preferably 1 or more, and even more preferably 2 or more, and is preferably 20 or less, more preferably 18 or less, and even more preferably 16 or less. The average value of m in the entire structure units of the polyvinyl ether is preferably 0 to 10.

The polyvinyl ether may be a homopolymer including one selected from the structural units represented by the formula (1), or may be a copolymer including two or more selected from the structural units represented by the formula (1), or may be a copolymer including a structural unit represented by the formula (1) and a different structural unit. When the polyvinyl ether is a copolymer, lubricity, insulation properties, hygroscopicity, and the like can be further improved while satisfying compatibility of a refrigerating machine oil with a refrigerant. In this case, appropriate selection of the types of raw monomers, the type of initiator, the ratio of structural units in a copolymer, and the like can confer the aforementioned various properties on the refrigerating machine oil. The copolymer may be either a block copolymer or a random copolymer.

When the polyvinyl ether is a copolymer, the copolymer preferably has a structural unit (1-1) represented by the above formula (1) wherein $R^{54}$ is an alkyl group having 1 to 3 carbon atoms and a structural unit (1-2) represented by the above formula (1) wherein $R^{54}$ is an alkyl group having 3 to 20 carbon atoms. The number of carbon atoms of $R^{54}$ in the structural unit (1-2) is preferably 3 to 10, more preferably 3 to 8. $R^{54}$ in the structural unit (1-1) is particularly preferably an ethyl group, and $R^{54}$ in the structural unit (1-2) is particularly preferably an isobutyl group. When the polyvinyl ether is a copolymer having the above structural units (1-1) and (1-2), the molar ratio of the structural unit (1-1) and the structural unit (1-2) is preferably 5:95 to 95:5, more preferably 20:80 to 90:10, and even more preferably 70:30 to 90:10. When the above molar ratio falls within the above ranges, compatibility with a refrigerant tends to be able to be further improved, and hygroscopicity tends to be able to be lowered.

The polyvinyl ether may consist of a structural unit represented by the above formula (1), or may be a copolymer further including a structural unit represented by the following formula (2). In the latter case, the copolymer may be either a block copolymer or a random copolymer.

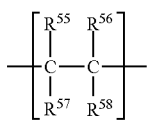

(2)

wherein $R^{55}$ to $R^{58}$ may be the same or different from each other, and each represent a hydrogen atom or a hydrocarbon group having 1 to 20 carbon atoms.

The polyvinyl ether may be manufactured by polymerizing a vinyl ether-based monomer corresponding to a structural unit represented by the formula (1), or by copolymering a vinyl ether-based monomer corresponding to a structural unit represented by the formula (1) with a hydrocarbon monomer having an olefinic double bond corresponding to a structural unit represented by the formula (2). As the vinyl ether-based monomer corresponding to a structural unit represented by the formula (1), a monomer represented by the following formula (3) is suitable:

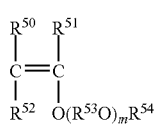

(3)

wherein $R^{50}$, $R^{51}$, $R^{52}$, $R^{53}$, $R^{54}$ and m have the same definition as defined for $R^{50}$, $R^{51}$, $R^{52}$, $R^{53}$, $R^{54}$ and m in the formula (1), respectively.

The polyvinyl ether preferably has the following terminal structure (I) or (II).

(I) A structure in which one end is represented by the formula (4) or (5) while the other end is represented by the formula (6) or (7).

(4)

In the formula (4), $R^{59}$, $R^{60}$ and $R^{61}$ may be the same or different from each other, and each represent a hydrogen atom or a hydrocarbon group having 1 to 8 carbon atoms, and $R^{62}$ represents a divalent hydrocarbon group or a divalent ether-linked oxygen-containing hydrocarbon group having 1 to 10 carbon atoms, and $R^{63}$ represents a hydrocarbon group having 1 to 20 carbon atoms, and m has the same definition as defined for m in the formula (1). When m is 2 or more, multiple Rs$^{62}$ may be the same or different from each other.

(5)

In the formula (5), $R^{64}$, $R^{65}$, $R^{66}$ and $R^{67}$ may be the same or different from each other, and each represent a hydrogen atom or a hydrocarbon group having 1 to 20 carbon atoms.

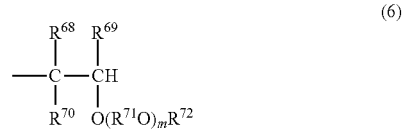

(6)

In the formula (6), $R^{68}$, $R^{69}$ and $R^{70}$ may be the same or different from each other, and each represent a hydrogen atom or a hydrocarbon group having 1 to 8 carbon atoms, and $R^{71}$ represents a divalent hydrocarbon group or a divalent ether-linked oxygen-containing hydrocarbon group having 1 to 10 carbon atoms, and $R^{72}$ represents a hydrocarbon group having 1 to 20 carbon atoms, and m has the same definition as defined for m in the formula (1). When m is 2 or more, multiple Rs$^{71}$ may be the same or different from each other.

(7)

In the formula (7), $R^{73}$, $R^{74}$, $R^{75}$, and $R^{76}$ may be the same or different from each other, and each represent a hydrogen atom or a hydrocarbon group having 1 to 20 carbon atoms.

(II) A structure in which one end is represented by the above formula (4) or (5) while the other end is represented by the following formula (8):

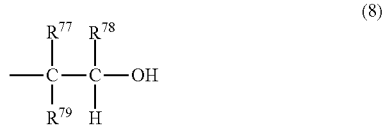

In the formula (8), $R^{77}$, $R^{78}$ and $R^{79}$ may be the same or different from each other, and each represent a hydrogen atom or a hydrocarbon group having 1 to 8 carbon atoms.

Among these polyvinyl ethers, those of (P1), (P2), (P3), (P4), and (P5) listed below are particularly suitable as the base oil.

(P1) A polyvinyl ether having a structure in which one end is represented by the formula (4) or (5), and the other end is represented by the formula (6) or (7), and in which $R^{50}$, $R^{51}$, and $R^{52}$ in the formula (1) are each a hydrogen atom, and m is an integer of 0 to 4, and $R^{53}$ is a divalent hydrocarbon group having 2 to 4 carbon atoms, and $R^{54}$ is a hydrocarbon group having 1 to 20 carbon atoms.

(P2) A polyvinyl ether including only a structural unit represented by the formula (1) and having a structure in which one end is represented by the formula (4), and the other end is represented by the formula (6), and in which $R^{50}$, $R^{51}$, and $R^{52}$ in the formula (1) are each a hydrogen atom, and m is an integer of 0 to 4, and $R^{53}$ is a divalent hydrocarbon group having 2 to 4 carbon atoms, and $R^{54}$ is a hydrocarbon group having 1 to 20 carbon atoms.

(P3) A polyvinyl ether having a structural in which one end is represented by the formula (4) or (5), and the other end is represented by the formula (8), and in which $R^{50}$, $R^{51}$, and $R^{32}$ in the formula (1) are each a hydrogen atom, and m is an integer of 0 to 4, and $R^{53}$ is a divalent hydrocarbon group having 2 to 4 carbon atoms, and $R^{54}$ is a hydrocarbon group having 1 to 20 carbon atoms.

(P4) A polyvinyl ether including only a structural unit represented by the formula (1) and having a structure in which one end is represented by the formula (5), and the other end is represented by the formula (8), and in which $R^{50}$, $R^{51}$, and $R^{32}$ in the formula (1) are each a hydrogen atom, and m is an integer of 0 to 4, and $R^{53}$ is a divalent hydrocarbon group having 2 to 4 carbon atoms, and $R^{54}$ is a hydrocarbon group having 1 to 20 carbon atoms.

(P5) A polyvinyl ether of any of the above (P1), (P2), (P3) and (P4) having a structural unit in which $R^{54}$ in the formula (1) is a hydrocarbon group having 1 to 3 carbon atoms and a structural unit in which $R^{54}$ in the formula (1) is a hydrocarbon group having 3 to 20 carbon atoms.

The weight average molecular weight of the polyvinyl ether is preferably 500 or more, more preferably 600 or more, and is also preferably 3000 or less, more preferably 2000 or less, and even more preferably 1500 or less. When the polyvinyl ether has a weight average molecular weight of 500 or more, the refrigerating machine oil can have superior lubricity in the presence of a refrigerant. When the weight average molecular weight is 3000 or less, a range of compositions within which compatibility with a refrigerant can be obtained under low-temperature conditions can be wider, and poor lubrication in a refrigerant compressor and deteriorated heat exchange in an evaporator can be prevented.

The number average molecular weight of the polyvinyl ether is preferably 500 or more, more preferably 600 or more, and is also preferably 3000 or less, more preferably 2000 or less, and even more preferably 1500 or less. When the polyvinyl ether has a number average molecular weight of 500 or more, the refrigerating machine oil can have superior lubricity in the presence of a refrigerant. When the number average molecular weight is 3000 or less, a range of compositions within which compatibility with a refrigerant can be obtained under low-temperature conditions can be wider, and poor lubrication in a refrigerant compressor and deteriorated heat exchange in an evaporator can be prevented.

The weight average molecular weight and number average molecular weight of the polyvinyl ether each refer to a value determined by the GPC analysis (in terms of polystyrene (standard sample)). For example, the weight average molecular weight and number average molecular weight can be determined as follows.

Dilution is performed using chloroform as a solvent to prepare a solution with a polyvinyl-ether concentration of 1% by mass. The solution is analyzed with a GPC instrument (Waters Alliance 2695). Analysis is performed with a refractive index detector at a solvent flow rate of 1 ml/min using a column capable of analyzing a molecular weight of 100 to 10000. It is noted that the relationship between column retention time and molecular weight is separately determined using a polystyrene standard having a known molecular weight to create a calibration curve, and the molecular weight of a sample is then determined from a measured retention time.

The polyvinyl ether preferably has a degrees of unsaturation of 0.04 meq/g or less, more preferably 0.03 meq/g or less, and even more preferably 0.02 meq/g or less. The polyvinyl ether preferably has a peroxide value of a 10.0 meq/kg or less, more preferably 5.0 meq/kg or less, and even more preferably 1.0 meq/kg or less. The polyvinyl ether preferably has a carbonyl value of 100 ppm by weight or less, more preferably 50 ppm by weight or less, and even more preferably 20 ppm by weight or less. The polyvinyl ether preferably has a hydroxy value of 10 mg KOH/g or less, more preferably 5 mg KOH/g or less, and even more preferably 3 mg KOH/g or less.

The degree of unsaturation, peroxide value, and carbonyl value in the present specification each refer to a value as measured in accordance with the Standard Methods for the Analysis of Fats, Oils and Related Materials defined by the Japan Oil Chemists' Society. That is, with regard to the degree of unsaturation in the present specification, a sample is allowed to react with a Wij's solution (a solution of ICl-acetic acid), and left stand in a dark place, and then excess ICl is reduced into iodine, and that iodine is subsequently titrated with sodium thiosulfate to calculate an iodine value. The iodine value is then converted into a value (meq/g) in terms of vinyl equivalent. This value is used as the degree of unsaturation. With regard to the peroxide value in the present specification, potassium iodide is added to a sample, and the resulting free iodine is titrated with sodium thiosulfate, and the amount of the free iodine determined is converted into a value (meq/kg) in milliequivalent per kg of the sample. This value is used as the peroxide value. With regard to the carbonyl value in the present specification, a sample is allowed to react with 2,4-dinitrophenylhydrazine to generate chromogenic quinonoid ions. The absorbance of the sample at 480 nm is measured and converted to a value (ppm by weight) in terms of the amount of carbonyl based on a calibration curve which is pre-determined using cinnamaldehyde as the standard substance. This value is used as the carbonyl value. The hydroxy value in the present specification means a hydroxy value measured in accordance with JIS K0070:1992.

Examples of the polyalkylene glycol include polyethylene glycol, polypropylene glycol, polybutylene glycol, and the like. The polyalkylene glycol includes oxyethylene, oxypropylene, oxybutylene, or the like as a structural unit. Polyalkylene glycols having these structural units can be obtained by ring-opening polymerization of ethylene oxide, propylene oxide, or butylene oxide as a raw monomer material, respectively.

Examples of the polyalkylene glycol include, for example, compounds represented by the following formula (9):

$$R^{\alpha}[(OR^{\beta})_f-OR^{\gamma}]_g \qquad (9)$$

wherein $R^{\alpha}$ represents a hydrogen atom, an alkyl group having 1 to 10 carbon atoms, an acyl group having 2 to 10 carbon atoms, or a residue of a compound having 2 to 8 hydroxy groups, and $R^{\beta}$ represents an alkylene group having 2 to 4 carbon atoms, and $R^{\gamma}$ represents a hydrogen atom, an alkyl group having 1 to 10 carbon atoms, or an acyl group having 2 to 10 carbon atoms, and f represents an integer of 1 to 80, and g represents an integer of 1 to 8.

The alkyl groups represented by $R^{\alpha}$ and $R^{\gamma}$ may be any of linear, branched, or cyclic. The number of carbon atoms of these alkyl groups is preferably 1 to 10, more preferably 1 to 6. When the number of carbon atoms of the alkyl groups is 10 or less, the refrigerating machine oil tends to have excellent compatibility with a refrigerant.

The alkyl-group moieties of the acyl groups represented by $R^{\alpha}$ and $R^{\gamma}$ may be any of linear, branched, or cyclic. The number of carbon atoms of the acyl groups is preferably 2 to 10, more preferably 2 to 6. When the number of carbon atoms of these acyl groups is 10 or less, the refrigerating machine oil tends to have excellent compatibility with a refrigerant, leading to less-likely occurrence of phase separation.

When the groups represented by $R^{\alpha}$ and $R^{\gamma}$ are both alkyl groups or both acyl groups, the groups represented by $R^{\alpha}$ and $R^{\gamma}$ may be the same or different. When g is 2 or more, the groups represented by multiple $Rs^{\alpha}$ and $Rs^{\gamma}$ in the same molecule may be the same or different.

When the group represented by $R^{\alpha}$ is a residue of a compound having 2 to 8 hydroxy groups, the compound may be chain or cyclic.

In view of excellent compatibility, at least one of $R^{\alpha}$ and $R^{\gamma}$ is preferably an alkyl group, more preferably an alkyl group having 1 to 4 carbon atoms, and even more preferably a methyl group. In view of excellent heat and chemical stability, both of $R^{\alpha}$ and $R^{\gamma}$ are preferably alkyl groups, more preferably alkyl groups having 1 to 4 carbon atoms, and even more preferably methyl groups. In view of manufacturability and cost, one of $R^{\alpha}$ or $R^{\gamma}$ is preferably an alkyl group (more preferably an alkyl group having 1 to 4 carbon atoms) while the other is a hydrogen atom. More preferably, one is a methyl group while the other is a hydrogen atom. In view of excellent lubricity and sludge solubility, both of $R^{\alpha}$ and $R^{\gamma}$ are hydrogen atoms.

$R^{\beta}$ represents an alkylene group having 2 to 4 carbon atoms. Specific examples of such an alkylene group include an ethylene group, a propylene group, a butylene group, and the like. Further, examples of an oxyalkylene group as a repeating unit represented by $OR^{\beta}$ include an oxyethylene group, an oxypropylene group, and an oxybutylene group.

The oxyalkylene groups represented by $(OR^{\beta})_f$ may include one type of oxyalkylene group, or may include two or more types of oxyalkylene groups.

The polyalkylene glycol represented by the formula (9) is preferably a copolymer including an oxyethylene group (EO) and an oxypropylene group (PO) in view of excellent compatibility with a refrigerant and viscosity-temperature properties. In this case, the ratio (EO/(PO+EO)) of the oxyethylene group to the total of the oxyethylene group and the oxypropylene group is preferably 0.1 to 0.8, more preferably 0.3 to 0.6 in view of excellent seizure load and viscosity-temperature properties. In view of excellent hygroscopicity and heat/oxidation stability, EO/(PO+EO) is preferably 0 to 0.5, more preferably 0 to 0.2, even more preferably 0 (that is, a homopolymer of propylene oxide).

f represents the number of repeats (the degree of polymerization) of the oxyalkylene group $OR^{\beta}$, and is an integer of 1 to 80. g is an integer of 1 to 8. For example, g is 1 when $R^{\alpha}$ is an alkyl group or an acyl group. When $R^{\alpha}$ is a residue of a compound having 2 to 8 hydroxy groups, g corresponds to the number of hydroxy groups in the compound.

In the polyalkylene glycol represented by the formula (9), the average value of the product (f×g) of f and g is preferably 6 to 80 because this will satisfy required performances as a refrigerating machine oil in a well balanced manner.

The weight average molecular weight of the polyalkylene glycol is preferably 500 or more, more preferably 600 or more, and is also preferably 3000 or less, more preferably 2000 or less, and even more preferably 1500 or less. When the polyalkylene glycol has a weight average molecular weight of 500 or more, the refrigerating machine oil can have superior lubricity in the presence of a refrigerant. When the weight average molecular weight is 3000 or less, a range of compositions within which the refrigerating machine oil shows compatibility with a refrigerant under low-temperature conditions can be wider, and poor lubrication in a refrigerant compressor and deteriorated heat exchange in an evaporator can be prevented.

The number average molecular weight of the polyalkylene glycol is preferably 500 or more, more preferably 600 or more, and is also preferably 3000 or less, more preferably 2000 or less, and even more preferably 1500 or less. When the polyalkylene glycol has a number average molecular weight of 500 or more, the refrigerating machine oil can have superior lubricity in the presence of a refrigerant. When the number average molecular weight is 3000 or less, a range of compositions within which the refrigerating machine oil shows compatibility with a refrigerant under low-temperature conditions can be wider, and poor lubrication in a refrigerant compressor and deteriorated heat exchange in an evaporator can be prevented.

The weight average molecular weight and number average molecular weight of the polyalkylene glycol each mean a value determined by GPC analysis (in terms of polypropylene glycol (standard sample)). For example, the weight average molecular weight and number average molecular weight can be determined as follows.

Dilution is performed using chloroform as a solvent to prepare a solution with a polyalkylene-glycol concentration of 1% by mass. The solution is analyzed with a GPC instrument (Waters Alliance 2695). Analysis is performed with a refractive index detector at a solvent flow rate of 1 ml/min using a column capable of analyzing a molecular weight of 100 to 10000. It is noted that the relationship between column retention time and molecular weight is separately determined using a polyalkylene glycol standard having a known molecular weight to create a calibration curve, and the molecular weight of a sample is then determined from a measured retention time.

The hydroxy value of the polyalkylene glycol is preferably 100 mg KOH/g or less, more preferably 50 mg KOH/g or less, even more preferably 30 mg KOH/g or less, and most preferably 10 mg KOH/g or less.

The polyalkylene glycol can be synthesized by a known method (Mitsuta Shibata et al., "alkylene oxide polymer," Kaibundo Publishing Co., Ltd., Nov. 20, 1990). For example, one or more predetermined alkylene oxides are addition-polymerized with alcohol ($R^\alpha OH$; $R^\alpha$ has the same definition as defined for $R^\alpha$ in the formula (9)), and terminal hydroxyl groups are further etherified or esterified to obtain the polyalkylene glycol represented by the formula (9). When two or more alkylene oxides are used in the above manufacturing process, the obtained polyalkylene glycol may be either a random copolymer or a block copolymer, but is preferably a block copolymer in view of the tendency of having superior oxidation stability and lubricity, and preferably a random copolymer in view of the tendency of having superior low-temperature fluidity.

The polyalkylene glycol preferably has a degrees of unsaturation of 0.04 meq/g or less, more preferably 0.03 meq/g or less, and even more preferably 0.02 meq/g or less. The polyalkylene glycol preferably has a peroxide value of a 10.0 meq/kg or less, more preferably 5.0 meq/kg or less, and even more preferably 1.0 meq/kg or less. The polyalkylene glycol preferably has a carbonyl value of 100 ppm by weight or less, more preferably 50 ppm by weight or less, and even more preferably 20 ppm by weight or less.

The base oil is preferably at least one selected from oxygen-containing oils, more preferably at least one selected from esters and ethers, and is even more preferably an ester.

The kinematic viscosity at 40° C. of the base oil is preferably 3 mm²/s or more, more preferably 4 mm²/s or more, and even more preferably 5 mm²/s or more. The kinematic viscosity at 40° C. of the base oil is preferably 1000 mm²/s or less, more preferably 500 mm²/s or less, and even more preferably 400 mm²/s or less. The kinematic viscosity at 100° C. of the base oil is preferably 1 mm²/s or more, more preferably 2 mm²/s or more. The kinematic viscosity at 100° C. of the base oil is preferably 100 mm²/s or less, more preferably 50 mm²/s or less. The kinematic viscosity in the present specification means a kinematic viscosity measured in accordance with JIS K2283:2000.

The content of the base oil may be 50% by mass or more, 60% by mass or more, 70% by mass or more, 80% by mass or more, or 90% by mass or more, based on the total amount of the refrigerating machine oil.

The refrigerating machine oil further contains a dithiophosphoric acid ester in addition to the base oil. The dithiophosphoric acid ester is a compound having a partial structure represented by the following formula (a):

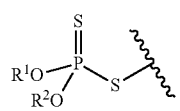

(a)

wherein $R^1$ and $R^2$ each independently represent hydrogen atom or a monovalent hydrocarbon group, and at least one of $R^1$ and $R^2$ represents a monovalent hydrocarbon group.

The monovalent hydrocarbon group represented by $R^1$ or $R^2$ preferably represents a chain (linear or branched) or cyclic alkyl group, more preferably a chain (linear or branched) alkyl group, and still more preferably a branched alkyl group. The carbon number of the monovalent hydrocarbon group (alkyl group) represented by $R^1$ or $R^2$ may be 3 or more or 4 or more, and may be 9 or less, 8 or less, 7 or less, 6 or less, 5 or less, or 4 or less, or may be 4. Preferably, both $R^1$ and $R^2$ are the monovalent hydrocarbon groups.

The dithiophosphoric acid ester is, for example, a compound represented by the following formula (A-1):

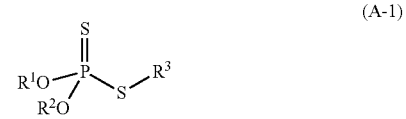

(A-1)

wherein $R^1$ and $R^2$ have the same meanings as $R^1$ and $R^2$ in the formula (a), and $R^3$ represents a monovalent organic group.

The monovalent organic group represented by $R^3$ is preferably an organic group composed of a carbon atom, a hydrogen atom and an oxygen atom. The organic group preferably has a carboxyl group or an ester group.

From the viewpoint of further improving the antiwear property of the refrigerating machine oil, the dithiophosphoric acid ester is preferably a compound represented by the following formula (A-2) (dithiophosphorylated carboxylic acid or a derivative thereof):

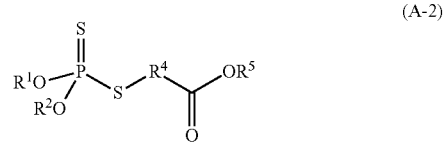

(A-2)

wherein $R^1$ and $R^2$ have the same meanings as $R^1$ and $R^2$ in the formula (a), $R^4$ represents a divalent hydrocarbon group, and $R^5$ represents hydrogen atom or a monovalent hydrocarbon group.

The divalent hydrocarbon group represented by $R^4$ may be, for example, a linear or branched alkylene group, and is preferably a branched alkylene group. The number of carbon atoms of the divalent hydrocarbon group (alkylene group) represented by $R^4$ may be 1 or more, 2 or more, or 3 or more, and may be 10 or less, 9 or less, 8 or less, 7 or less, 6 or less, 5 or less, 4 or less, or 3 or less, and may be 4, and may be 3.

The monovalent hydrocarbon group represented by $R^5$ may be, for example, a linear or branched alkyl group. The number of carbon atoms of the hydrocarbon group (alkyl group) represented by $R^5$ may be 1 or more or 2 or more, and may be 10 or less, 9 or less, 8 or less, 7 or less, 6 or less, 5 or less, 4 or less, or 3 or less. $R^5$ is preferably hydrogen atom from the viewpoint of further improving the antiwear property of the refrigerating machine oil (a large effect of improving the antiwear property is obtained even when the content of dithiophosphoric acid ester is small).

From the viewpoint of further improving the antiwear property of the refrigerating machine oil (a large effect of improving the antiwear property is obtained even when the content of the dithiophosphoric acid ester is small), the dithiophosphoric acid ester is more preferably a compound represented by the following formula (A-3):

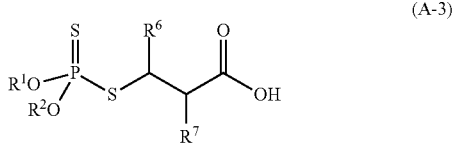

(A-3)

wherein $R^1$ and $R^2$ have the same meanings as $R^1$ and $R^2$ in the formula (a), and $R^6$ and $R^7$ each independently represent hydrogen atom or an alkyl group.

The alkyl group represented by $R^6$ or $R^7$ may be linear or branched, and is preferably linear. The number of carbon atoms of the alkyl group may be, for example, 1 or more, and may be 4 or less, 3 or less, or 2 or less, and may be 1. Preferably, at least one of $R^6$ and $R^7$ is preferably the alkyl group. More preferably, one of $R^6$ and $R^7$ is the alkyl group and the other is hydrogen atom. That is, from the viewpoint of further improving the antiwear property of the refrigerating machine oil, the dithiophosphoric acid ester is more preferably a compound represented by the following formula (A-4) or (A-5):

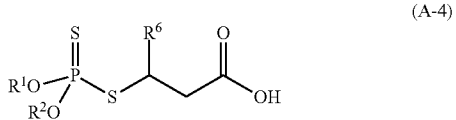

(A-4)

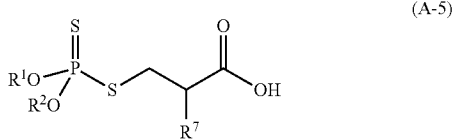

(A-5)

wherein $R^1$ and $R^2$ have the same meanings as $R^1$ and $R^2$ in the formula (a), and $R^6$ and $R^7$ have the same meanings as $R^6$ and $R^7$ in the formula (A-3).

The content of the dithiophosphoric acid ester may be 0.001% by mass or more, 0.005% by mass or more, or 0.01% by mass or more, and may be 5% by mass or less, 1% by mass or less, 0.9% by mass or less, 0.7% by mass or less, 0.5% by mass or less, 0.3% by mass or less, 0.1% by mass or less, or 0.06% by mass or less, based on the total amount of the refrigerating machine oil.

The refrigerating machine oil further contains an amine salt of acidic phosphoric acid ester in addition to the base oil and the dithiophosphoric acid ester. The amine salt of acidic phosphoric acid ester is, for example, a salt of an acidic phosphoric acid ester represented by the following formula (B-1) and an amine represented by the following formula (B-2):

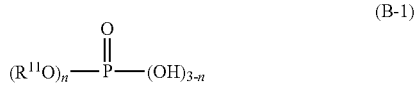

(B-1)

(B-2)

wherein $R^{11}$ represents a monovalent hydrocarbon group, n represents 1 or 2, and $R^{12}$, $R^{13}$ and $R^{14}$ each independently represent hydrogen atom or a monovalent hydrocarbon group, and at least one of $R^{12}$, $R^{13}$ and $R^{14}$ represents a monovalent hydrocarbon group.

The monovalent hydrocarbon group represented by $R^{11}$ may be an alkyl group or an alkenyl group, and is preferably an alkyl group. The alkyl group and the alkenyl group may be linear or branched, and are preferably linear. The carbon number of the monovalent hydrocarbon group (alkyl group or alkenyl group) may be 1 or more, 2 or more, 3 or more, or 4 or more, and may be 18 or less, 16 or less, 14 or less, 12 or less, 10 or less, or 8 or less. When n is 2, two $R^{11}$s present in one molecule may be the same as or different from each other.

The monovalent hydrocarbon group represented by $R^{12}$, $R^{13}$ or $R^{14}$ may be an alkyl group or an alkenyl group, and is preferably an alkyl group. The alkyl group and the alkenyl group may be linear or branched, and are preferably branched. The carbon number of the monovalent hydrocarbon group (alkyl group or alkenyl group) may be 1 or more, 3 or more, 5 or more, 7 or more, 9 or more, or 11 or more, and may be 20 or less, 18 or less, 16 or less, or 14 or less.

When preparing the refrigerating machine oil containing the amine salt of acidic phosphoric acid ester, the acidic phosphoric acid ester and the amine in a state of forming a salt may be added to the base oil or the like, or the acidic phosphoric acid ester and the amine may be separately added to the base oil or the like.

The content of the amine salt of acidic phosphoric acid ester may be 0.005% by mass or more, 0.01% by mass or more, or 0.02% by mass or more, and may be 1% by mass or less, 0.2% by mass or less, or 0.1% by mass or less, based on the total amount of the refrigerating machine oil.

The antiwear property and stability of the refrigerating machine oil can be further improved by adjusting the content ratio of the dithiophosphoric acid ester and the amine salt of acidic phosphoric acid ester in the refrigerating machine oil. From the viewpoint of further improving the stability of the refrigerating machine oil, the mass ratio of the content of the dithiophosphoric acid ester to the total content of the dithiophosphoric acid ester and the amine salt of acidic phosphoric acid ester (content (mass) of the dithiophosphoric acid ester/total content (mass) of the dithiophosphoric acid ester and the amine salt of acidic phosphoric acid ester) is preferably 0.1 or more or 0.2 or more, more preferably 0.3 or more, 0.4 or more, or 0.5 or more, and still more preferably 0.55 or more or 0.6 or more. From the viewpoint of further improving the antiwear property of the refrigerating machine oil, the mass ratio is preferably 0.9 or less, 0.8 or less, or 0.7 or less, more preferably 0.6 or less or 0.5 or less, and still more preferably 0.4 or less or 0.35 or less.

From the viewpoint of further improving antiwear property, the refrigerating machine oil may further contain a phosphorus-based antiwear agent other than the dithiophosphoric acid ester and the amine salt of acidic phosphoric acid ester. Other phosphorus-based antiwear agents may be phosphoric acid esters, acidic phosphoric acid esters, thiophosphoric acid esters (monothiophosphoric acid esters), chlorinated phosphoric acid esters, phosphite esters, and the like.

The content of the other phosphorus-based antiwear agent may be 0.01% by mass or more, 0.05% by mass or more, or 0.1% by mass or more, and may be 2% by mass or less, 1.5% by mass or less, or 1% by mass or less, based on the total amount of the refrigerating machine oil.

Among the other phosphorus-based antiwear agents, the refrigerating machine oil preferably further contains a thiophosphoric acid ester, more preferably a thiophosphoric acid triester, from the viewpoint of further improving wear resistance. The thiophosphoric acid triester is preferably a compound represented by the following formula (C):

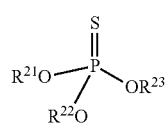 (C)

wherein $R^{21}$, $R^{22}$ and $R^{23}$ each independently represent a monovalent hydrocarbon group.

The monovalent hydrocarbon group represented by $R^{21}$, $R^{22}$ or $R^{23}$ may be an alkyl group or an aryl group, preferably an aryl group, and more preferably phenyl group. The alkyl group may be linear or branched. The carbon number of the monovalent hydrocarbon group (alkyl group or aryl group) may be 2 or more, 3 or more, 4 or more, 5 or more, or 6 or more, and may be 10 or less, 9 or less, 8 or less, or 7 or less.

The content of the thiophosphate ester may be 0.005% by mass or more, 0.01% by mass or more, or 0.02% by mass or more, and may be 1% by mass or less, 0.2% by mass or less, or 0.1% by mass or less, based on the total amount of the refrigerating machine oil.

The refrigerating machine oil may further contain other additives. Examples of the other additives include acid scavengers, antioxidants, extreme pressure agents, oiliness agents, antifoaming agents, metal deactivators, antiwear agents other than phosphorus-based antiwear agents, viscosity index improvers, pour point depressants, and detergent dispersants. The total content of these additives may be 15% by mass or less or 10% by mass or less based on the total amount of the refrigerating machine oil.

The acid scavenger may be, for example, an epoxy compound, a carbodiimide compound or the like, and is preferably an epoxy compound. The epoxy compound may be a glycidyl ether type epoxy compound, a glycidyl ester type epoxy compound, an oxirane compound, an alkyloxirane compound, an alicyclic epoxy compound, an epoxidized fatty acid monoester, an epoxidized vegetable oil, or the like. The antioxidant may be a phenolic antioxidant such as 2,6-di-tert-butyl-p-cresol, bisphenol A, or the like.

From the viewpoint of further improving the stability of the refrigerating machine oil, the sulfur content of the refrigerating machine oil is preferably 0.2% by mass or less, more preferably 0.15% by mass or less, and still more preferably 0.1% by mass or less. The sulfur content of the refrigerating machine oil may be, for example, 0.01% by mass or more. The sulfur content of the refrigerating machine oil can be adjusted, for example, by adjusting the content of the dithiophosphoric acid ester or the content of other additives containing sulfur (for example, the above-mentioned thiophosphoric acid ester (monothiophosphoric acid ester)). The sulfur content in the present specification means a sulfur content measured by an ultraviolet fluorescence method defined in JIS K2541-6:2013.

The kinematic viscosity at 40° C. of the refrigerating machine oil may be preferably 3 mm$^2$/s or more, more preferably 4 mm$^2$/s or more, and even preferably 5 mm$^2$/s or more. The kinematic viscosity at 40° C. of the refrigerating machine oil may be preferably 500 mm$^2$/s or less, more preferably 400 mm$^2$/s or less, and even more preferably 300 mm$^2$/s or less.

The kinematic viscosity at 100° C. of the refrigerating machine oil may be preferably 1 mm$^2$/s or more, and more preferably 2 mm$^2$/s or more. The kinematic viscosity at 100° C. of the refrigerating machine oil may be 100 mm$^2$/s or less, and more preferably 50 mm$^2$/s or less.

The pour point of the refrigerating machine oil may be preferably −10° C. or less, and more preferably −20° C. or less. The pour point in the present specification means a pour point measured in accordance with JIS K2269-1987.

The volume resistivity of the refrigerating machine oil may be preferably $1.0\times10^9$ Ω·m or more, more preferably $1.0\times10^{10}$ Ω·m or more, and even more preferably $1.0\times10^{11}$ Ω·m or more. The volume resistivity in the present specification means a volume resistivity at 25° C. measured in accordance with JIS C2101:1999.

The moisture content of the refrigerating machine oil may be preferably 200 ppm or less, more preferably 100 ppm or less, and even more preferably 50 ppm or less, based on the total amount of the refrigerating machine oil. The moisture content in the present specification means a moisture content measured in accordance with JIS K2275-3:2015.

The acid value of the refrigerating machine oil may be 1.0 mg KOH/g or less, and more preferably 0.1 mg KOH/g or less. The acid value in the present specification means an acid value measured in accordance with JIS K2501:2003.

The ash content of the refrigerating machine oil may be preferably 100 ppm or less, and more preferably 50 ppm or less. The ash content in the present specification means an ash content measured in accordance with JIS K2272:1998.

The refrigerating machine oil is used with a refrigerant. In other words, another embodiment of the present invention is a working fluid composition for a refrigerating machine comprising the refrigerating machine oil described above and a refrigerant. The refrigerant contains at least one selected from the group consisting of a hydrofluorocarbon refrigerant, a hydrocarbon refrigerant, a fluorine-containing ether-based refrigerant such as perfluoroethers, a bis(trifluoromethyl) sulfide refrigerant, a trifluoroiodomethane refrigerant, and a natural refrigerant such as ammonia and carbon dioxide, and preferably contains at least one selected from the group consisting of hydrofluorocarbon refrigerants.

The hydrofluorocarbon refrigerant is selected from a saturated hydrofluorocarbon (HFC) refrigerant and an unsaturated hydrofluorocarbon (HFO) refrigerant. Examples of the saturated hydrofluorocarbon include saturated hydrofluorocarbons preferably having 1 to 3 carbon atoms, more preferably having 1 to 2 carbon atoms. Specific examples include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or mixtures of two or more of these.

The saturated hydrofluorocarbon may be appropriately selected from the above, depending on uses and required performances, but preferred examples include R32 alone; R23 alone; R134a alone; R125 alone; a mixture of R134a/R32=60 to 80% by mass/40 to 20% by mass; a mixture of R32/R125=40 to 70% by mass/60 to 30% by mass; a mixture of R125/R143a=40 to 60% by mass/60 to 40% by mass; a mixture of R134a/R32/R125=60% by mass/30% by mass/10% by mass; a mixture of R134a/R32/R125=40 to 70% by mass/15 to 35% by mass/5 to 40% by mass; a mixture of R125/R134a/R143a=35 to 55% by mass/1 to 15% by mass/40 to 60% by mass; and the like. More specifically, a mixture of R134a/R32=70/30% by mass; a mixture of R32/R125=60/40% by mass; a mixture of R32/R125=50/50% by mass (R410A); a mixture of R32/R125=45/55% by mass (R410B); a mixture of R125/R143a=50/50% by mass (R507C); a mixture of R32/R125/R134a=30/10/60% by mass; a mixture of R32/R125/R134a=23/25/52% by mass (R407C); a mixture of R32/R125/R134a=25/15/60% by mass (R407E); a mixture of R125/R134a/R143a=44/4/52% by mass (R404A); and the like can be used.

The unsaturated hydrofluorocarbon (HFO) refrigerant is preferably an unsaturated hydrofluorocarbon having 2 to 3 carbon atoms, more preferably fluoropropene, still more preferably fluoropropene having 3 to 5 fluorine atoms. The unsaturated hydrofluorocarbon is preferably any one or a mixture of two or more of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). The unsaturated hydrofluorocarbon refrigerant is preferably one or two or more selected from HFO-1225ye, HFO-1234ze and HFO-1234yf from the viewpoint of the refrigerant properties. The unsaturated hydrofluorocarbon refrigerant may be a fluoroethylene, and may be preferably 1,1,2-trifluoroethylene (HFO-1123). The unsaturated hydrofluorocarbon refrigerant may be 1-chloro-2,3,3,3-tetrafluoropropene (HCFO-1224 yd), and may be cis-1-chloro-2,3,3,3-tetrafluoropropene (HCFO-1224 yd (Z)), trans-1-chloro-2,3,3,3-tetrafluoropropene (HCFO-1224 yd (E)) or a mixture thereof.

The hydrocarbon refrigerant is preferably a hydrocarbon having 1 to 5 carbon atoms, and more preferably a hydrocarbon having 2 to 4 carbon atoms. Specific examples of the hydrocarbon include methane, ethylene, ethane, propylene, propane (R290), cyclopropane, normal butane, isobutane (R600a), cyclobutane, methylcyclopropane, 2-methylbutane, normal pentane, or mixtures of two or more of these. Among these, a hydrocarbon refrigerant in a gaseous form at 25° C. and 1 atmosphere is preferably used, and propane, normal butane, isobutane, 2-methylbutane, or mixtures thereof are more preferably used.

The content of the refrigerating machine oil in the working fluid composition may be 1 part by mass or more, or 2 parts by mass or more, and may be 500 parts by mass or less, or 400 parts by mass or less, based on 100 parts by mass of the refrigerant.

The refrigerating machine oil and the working fluid composition may suitably be used in air-conditioners having reciprocating or rotary hermetic compressors; refrigerators; open or closed car air-conditioners; dehumidifiers; water heaters, freezers, fridge freezer warehouse; automatic vending machines; showcases; refrigerating machines in chemical plants; refrigerating machines having centrifugal compressors; and the like.

EXAMPLES

The present invention will be described in more detail with reference to Examples below, but the present invention shall not be limited to these Examples.

Example 1

A refrigerating machine oil was prepared by mixing a base oil, a dithiophosphoric acid ester, and an amine salt of acidic phosphoric acid ester shown below with 1.7% by mass of other additives (including triphenyl phosphorothionate (thiophosphoric acid triester), an acid scavenger, and an antioxidant). The types and contents of the dithiophosphoric acid esters and the amine salts of acidic phosphoric acid ester are as shown in Table 1, and the content of the base oil is the remainder obtained by subtracting the total content of components (additives) other than the base oil from the total amount of the refrigerating machine oil. The content of each component is based on the total amount of the refrigerating machine oil (% by mass). Table 1 shows the mass ratio (A/(A+B)) of the content of the dithiophosphoric acid ester (A) to the total content of the dithiophosphoric acid ester and the amine salt of acidic phosphoric acid ester (A+B), and the sulfur content (% by mass) in the refrigerating machine oil.

Base oil: mixture of the following base oil 1 (70% by mass) and base oil 2 (30% by mass)
  Base oil 1: polyol ester of pentaerythritol and mixed fatty acid of 2-methylpropanoic acid/3,5,5-trimethylhexanoic acid (mixture ratio (mass ratio): 60/40) (40° C. kinematic viscosity: 46 mm²/s, 100° C. kinematic viscosity: 6.3 mm²/s)
  Base oil 2: complex ester obtained by reacting neopentyl glycol (1 mol) and 1,4-butanediol (0.2 mol) with adipic acid (1.5 mol) to obtain an ester intermediate, then further reacting the ester intermediate with 3,5,5-trimethylhexanol (1.1 mol) and removing the remaining unreacted substance by distillation (40° C. kinematic viscosity: 146 mm²/s, viscosity index: 140)

Dithiophosphoric Acid Ester A1: Compound Represented by the Following Formula (A1):

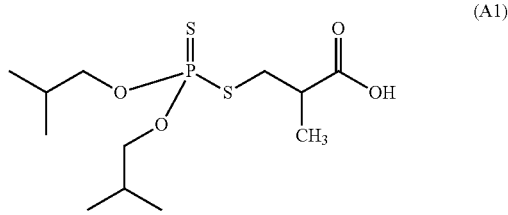 [SMILES: CC(C)COP(=S)(OCC(C)C)SCC(C)C(=O)O]

(A1)

Dithiophosphoric Acid Ester A2: Compound Represented by the Following Formula (A2):

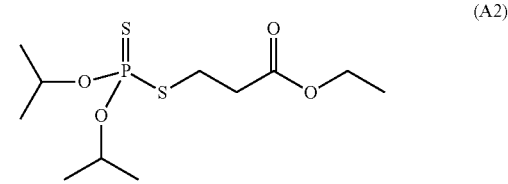 [SMILES: CCOC(=O)CCSP(=S)(OC(C)C)OC(C)C]

(A2)

Amine Salt of Acidic Phosphoric Acid Ester B1:
  C11-14 branched alkyl amine salt of mono-/di-hexyl phosphoric acid ester (salts of acidic phosphoric acid esters (mixture) in which $R^{11}$ is linear alkyl group having 6 carbon atoms (hexyl group) and n is 1 or 2 in the above formula (B-1) and amines (mixture) in which two of $R^{12}$, $R^{13}$ and $R^{14}$ are any of C11-14 branched alkyl groups and the other one is hydrogen atom in the above formula (B-2))

Amine Salt of Acidic Phosphoric Acid Ester B2:
  2-ethylhexyl amine salt of mono-/di-oleyl phosphoric acid ester (salts of acidic phosphoric acid esters (mixture) in which $R^{11}$ is unsaturated alkyl group having 18 carbon atoms (oleyl group) and n is 1 or 2 in the above formula (B-1) and amine in which one of $R^{12}$, $R^{13}$ and $R^{14}$ is 2-ethylhexyl group and the other two is hydrogen atom in the above formula (B-2))

Examples 2 to 5 and Comparative Examples 1 and 2

Refrigerating machine oils were prepared in the same manner as in Example 1, except that the types and contents of the dithiophosphoric acid esters and the amine salts of acidic phosphoric acid ester were changed as shown in Table 1.

[Evaluation of Antiwear Property]

The antiwear property was evaluated by the following procedure. First, a friction testing apparatus using a vane (SKH-51) as an upper test piece and a disk (SNCM220 HRC50) as a lower test piece was mounted inside a sealed container. 600 g of each refrigerating machine oil was introduced to the friction test site, and inside of the system was degassed under vacuum. Then, 100 g of a refrigerant (difluoromethane (R32)) was introduced into the system, and the system was heated. After the temperature in the sealed container was set to 110° C., a wear test was performed under the conditions of a load of 1000 N and a rotation speed of 750 rpm, and the wear amounts of the vane and the disk were measured after the test for 60 minutes. Smaller value of the wear amount means better antiwear property. The results are shown in Table 1.

[Evaluation of Stability]

The stability was evaluated in accordance with JIS K2211-09 (autoclave test). Specifically, 30 g of the refrigerating machine oil having a moisture content adjusted to 1000 ppm was weighed in an autoclave, catalysts (iron, copper or aluminum wire, each having an outer diameter of 1.6 mm and a length of 50 mm) and 30 g of refrigerant (difluoromethane (R32)) were sealed in the autoclave, the autoclave was heated to 175° C., and the acid value (JIS C2101) of the refrigerating machine oil after 168 hours was measured. The results are shown in Table 1.

the complex ester is an ester synthesized from
  neopentyl glycol,
  at least one selected from the group consisting of a dihydric alcohol having 2 to 10 carbon atoms other than neopentyl glycol,
  at least one selected from the group consisting of a polybasic acid having 6 to 12 carbon atoms, and
  at least one selected from the group consisting of a monohydric alcohol having 4 to 18 carbon atoms;
a content of the base oil is 90% by mass or more based on a total amount of the refrigerating machine oil,
the dithiophosphoric acid ester is a compound represented by the following formula (A-3):

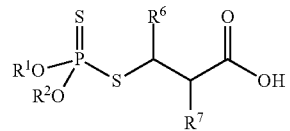

(A-3)

wherein $R^1$ and $R^2$ each independently represent an alkyl group having 3 or more and 9 or less carbon atoms, and $R^6$ and $R^7$ each independently represent a hydrogen atom or an alkyl group having 1 or more and 4 or less carbon atoms,
a content of the dithiophosphoric acid ester is 0.01% by mass or more and 0.1% by mass or less based on a total amount of the refrigerating machine oil,

TABLE 1

|  |  |  | Example 1 | Comparative Example 1 | Comparative Example 2 | Example 2 | Example 3 | Example 4 | Example 5 |
|---|---|---|---|---|---|---|---|---|---|
| Content (% by mass) | Dithiophosphoric acid ester | A1 | 0.03 | 0.03 | — | 0.03 | 0.05 | — | 0.03 |
|  |  | A2 | — | — | — | — | — | 0.3 | — |
|  | Amine salt of acidic phosphoric acid ester | B1 | 0.06 | — | 0.06 | 0.03 | 0.03 | 0.06 | — |
|  |  | B2 | — | — | — | — | — | — | 0.06 |
| A/(A + B) |  |  | 0.33 | 1 | 0 | 0.5 | 0.625 | 0.83 | 0.33 |
| Sulfer content (% by mass) |  |  | 0.05 | 0.05 | 0.05 | 0.05 | 0.06 | 0.07 | 0.05 |
| Antiwear property | Wear amount of vane (μm) |  | 0.8 | 3.0 | 1.9 | 1.1 | 1.3 | 1.5 | 0.85 |
|  | Wear amount of disk (μm) |  | 0.07 | 0.37 | 1.1 | 0.10 | 0.33 | 0.31 | 0.07 |
| Stability | Acid value (mgOH/g) |  | 0.41 | 0.53 | 0.54 | 0.41 | 0.26 | 0.38 | 0.43 |

As can be seen from Table 1, Examples 1 to 5 in which the dithiophosphoric acid ester and the amine salt of acidic phosphoric acid ester were used in combination as a phosphorus-based antiwear agents were superior in antiwear property and stability to Comparative Examples 1 and 2 in which only one of them was used. It is a particularly surprising effect that the stability is improved by the combined use of the dithiophosphoric acid ester and the amine salt of acidic phosphoric acid ester, which are known as phosphorus-based antiwear agents.

The invention claimed is:

1. A refrigerating machine oil comprising:
  a base oil comprising an ester and comprising no ether;
  a dithiophosphoric acid ester; and
  an amine salt of acidic phosphoric acid ester;
  wherein the base oil comprises at least one selected from the group consisting of a polyol ester and a complex ester,
  the polyol ester comprises a polyol ester of pentaerythritol and a fatty acid having 4 to 9 carbon atoms, the amine salt of acidic phosphoric acid ester is a salt of an acidic phosphoric acid ester represented by the following formula (B-1) and an amine represented by the following formula (B-2):

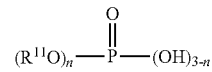

(B-1)

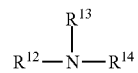

(B-2)

wherein $R^{11}$ represents an alkyl or alkenyl group having 4 or more and 18 or less carbon atoms, n represents 1 or 2, $R^{12}$, $R^{13}$ and $R^{14}$ each independently represent a hydrogen atom or an alkyl group having 5 or more and 16 or less carbon atoms, and at least one of $R^{12}$, $R^{13}$ and $R^{14}$ represents the alkyl group having 5 or more and 16 or less carbon atoms, a content of the amine salt of acidic phosphoric acid ester is 0.01% by mass or more and 0.1% by mass or less based on a total amount of the refrigerating machine oil, and wherein a mass ratio of the content of the dithiophosphoric acid ester to the total content of the dithiophosphoric acid ester and the amine salt of acidic phosphoric acid ester is 0.5 or less and wherein the refrigerating machine oil is used with a refrigerant.

2. The refrigerating machine oil according to claim 1, wherein the mass ratio of the content of the dithiophosphoric acid ester to the total content of the dithiophosphoric acid ester and the amine salt of acidic phosphoric acid ester is 0.1 or more and 0.5 or less.

3. The refrigerating machine oil according to claim 1, wherein the refrigerating machine oil has a sulfur content of 0.2% by mass or less.

4. The refrigerating machine oil according to claim 1, wherein the refrigerant comprises a hydrofluorocarbon refrigerant.

5. A working fluid composition for a refrigerating machine, comprising:
the refrigerating machine oil according to claim 1; and
a refrigerant.

6. The working fluid composition for a refrigerating machine according to claim 5, wherein the refrigerant comprises a hydrofluorocarbon refrigerant.

\* \* \* \* \*